(12) United States Patent
Bayer et al.

(10) Patent No.: US 9,485,543 B2
(45) Date of Patent: Nov. 1, 2016

(54) METHODS, SYSTEMS, AND MEDIA FOR PRESENTING SUGGESTIONS OF MEDIA CONTENT

(71) Applicant: Google Inc., Mountain View, CA (US)

(72) Inventors: Jason Bayer, San Francisco, CA (US); Eric H C Liu, Santa Clara, CA (US); Calvin Lee, Fremont, CA (US); Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/095,095

(22) Filed: Dec. 3, 2013

(65) Prior Publication Data

US 2015/0135225 A1  May 14, 2015

Related U.S. Application Data

(60) Provisional application No. 61/903,314, filed on Nov. 12, 2013, provisional application No. 61/903,865, filed on Nov. 13, 2013.

(51) Int. Cl.
| | |
|---|---|
| *H04N 5/445* | (2011.01) |
| *H04N 21/482* | (2011.01) |
| *H04N 21/466* | (2011.01) |
| *G06F 17/30* | (2006.01) |

(52) U.S. Cl.
CPC .... *H04N 21/4826* (2013.01); *G06F 17/30029* (2013.01); *G06F 17/30867* (2013.01); *H04N 21/4668* (2013.01)

(58) Field of Classification Search
CPC ............ H04N 21/251; H04N 21/466; H04N 21/4668
See application file for complete search history.

(56) References Cited

U.S. PATENT DOCUMENTS

| | | | | |
|---|---|---|---|---|
| 5,758,257 | A * | 5/1998 | Herz et al. ................... | 725/116 |
| 7,640,160 | B2 | 12/2009 | Cristo et al. | |
| 7,917,497 | B2 | 3/2011 | Harrison et al. | |
| 8,015,006 | B2 | 9/2011 | Kennewick et al. | |
| 8,839,303 | B2 | 9/2014 | Maddison et al. | |
| 9,020,824 | B1 | 4/2015 | Govil | |
| 9,026,516 | B1 | 5/2015 | Chapin et al. | |
| 9,201,979 | B2 * | 12/2015 | Ramer ............. | G06F 17/30749 |

(Continued)

FOREIGN PATENT DOCUMENTS

| | | |
|---|---|---|
| WO | WO/2011/062691 | 5/2011 |
| WO | WO/2011/102886 | 8/2011 |
| WO | WO/2012/015631 | 2/2012 |

OTHER PUBLICATIONS

Boissiere, G., "Personalized Multicast", Dissertation, Massachusetts Institute of Technology, Jun. 1998, pp. 1-76.

(Continued)

*Primary Examiner* — Gigi L Dubasky
(74) *Attorney, Agent, or Firm* — Byrne Poh LLP

(57) ABSTRACT

Methods, systems, and media for presenting suggestions of media content are provided. In some implementations, the method comprises: determining an item of media content; determining a probability of the item of media content being watched at one or more times based on at least one of: a characteristic of a person; a characteristic of a group; and a characteristic of the item of media content; creating a user interface which suggests that the item of media content be watched at one or more times based on the determined probability; and presenting the user interface.

18 Claims, 6 Drawing Sheets

(56) References Cited

U.S. PATENT DOCUMENTS

| | | |
|---|---|---|
| 2006/0095426 A1 | 5/2006 | Takachio et al. |
| 2008/0163317 A1 | 7/2008 | Mills |
| 2008/0285892 A1 | 11/2008 | Sposato et al. |
| 2009/0006368 A1 | 1/2009 | Mei et al. |
| 2009/0055385 A1 | 2/2009 | Jeon et al. |
| 2009/0082037 A1 | 3/2009 | Ju et al. |
| 2009/0210898 A1* | 8/2009 | Childress ............... H04H 60/46 725/34 |
| 2009/0222743 A1 | 9/2009 | Hadfield |
| 2010/0043040 A1* | 2/2010 | Olsen, Jr. ...................... 725/110 |
| 2010/0082653 A1 | 4/2010 | Nair |
| 2010/0205628 A1 | 8/2010 | Davis et al. |
| 2010/0251304 A1 | 9/2010 | Donoghue et al. |
| 2010/0305848 A1 | 12/2010 | Stallman |
| 2012/0059825 A1 | 3/2012 | Fishman et al. |
| 2012/0079429 A1 | 3/2012 | Stathacopoulos et al. |
| 2012/0102021 A1 | 4/2012 | Hill et al. |
| 2012/0110432 A1 | 5/2012 | Mei et al. |
| 2012/0117017 A1 | 5/2012 | Phillips et al. |
| 2012/0150957 A1 | 6/2012 | Bonchi |
| 2012/0239443 A1 | 9/2012 | Miller et al. |
| 2012/0266060 A1 | 10/2012 | Roberts et al. |
| 2013/0007792 A1 | 1/2013 | Jeon et al. |
| 2014/0075335 A1 | 3/2014 | Hicks et al. |
| 2014/0081633 A1 | 3/2014 | Badaskar |
| 2014/0281971 A1 | 9/2014 | Isbell et al. |
| 2014/0365517 A1 | 12/2014 | Calo et al. |
| 2015/0052128 A1 | 2/2015 | Sharifi |
| 2015/0100562 A1 | 4/2015 | Kohlmeier et al. |

OTHER PUBLICATIONS http://www.quickmeme.com/make, "Quickmeme", Quickmeme.com, pp. 1-4, downloaded on May 25, 2012.

http://zipmeme.com/generator, "ZIPMEME", Zipmeme.com, pp. 1-3, downloaded on May 25, 2012.

https://play.google.com/store/apps/details?id=com.zombodroid. MemeGenerator, "Meme Generator", ZomboDroid, pp. 1-2, downloaded on May 25, 2012.

Adomavicius, G. et al., "Toward the Next Generation of Recommender Systems: A Survey of the State-of-the-Art and Possible Extensions", in IEEE Transactions on Knowledge and Data Engineering, vol. 17, No. 6, Jun. 1, 2006, pp. 734-749.

Office Action dated Dec. 18, 2014 in U.S. Appl. No. 13/617,618.

Yu, Z. et al., "Supporting Context-Aware Media Recommendations for SMart Phones", in IEEE Pervasive Computing, vol. 5, No. 3, Jul. 1, 2006, pp. 68-75.

International Search Report & Written Opinion of the International Search Authority dated Feb. 12, 2015 in International Patent Application PCT/US2014/065284.

International Search Report dated Jan. 26, 2015 in International Patent Application No. PCT/US2014/065276.

Office Action dated Sep. 9, 2015 in U.S. Appl. No. 14/097,557.

Written Opinion of the International Search Authority dated Jan. 26, 2015 in International Patent Application No. PCT/US2014/065276.

Notice of Allowance dated Sep. 19, 2016 in U.S. Appl. No. 14/097,557.

\* cited by examiner

_US 9,485,543 B2_

METHODS, SYSTEMS, AND MEDIA FOR PRESENTING SUGGESTIONS OF MEDIA CONTENT

CROSS REFERENCE TO RELATED APPLICATIONS

This application claims the benefit of U.S. Provisional Patent Application Nos. 61/903,314, filed Nov. 12, 2013 and 61/903,865, filed Nov. 13, 2013, each of which is hereby incorporated by reference herein in its entirety.

TECHNICAL FIELD

The disclosed subject matter relates to methods, systems, and media for presenting suggestions of media content.

BACKGROUND

People enjoy viewing media content such as videos, movies, and television programs. Furthermore, people frequently have programs or genres that they frequently enjoy viewing, and they frequently have times of the day that they prefer to view media content. Additionally, there may be special, one-time programs, such as an awards show, a sports game, or a news broadcast, that a person is interested in watching.

It can be difficult to remember when a favorite program airs, or what date and/or time a special, one-time program is airing. Furthermore, if a person enjoys a particular television program or piece of media content, it can be difficult to find other, similar media content.

Accordingly, it is desirable to provide new systems, methods, and media for presenting suggestions of media content.

SUMMARY

Methods, systems, and media for presenting suggestions of media content are provided. In accordance with some implementations of the disclosed subject matter, methods for presenting suggestions of media content are provided, the methods comprising: determining an item of media content; determining, using a hardware processor, a probability of the item of media content being watched at one or more times based on at least one of: a characteristic of a person; a characteristic of a group; and a characteristic of the item of media content; creating a user interface which suggests that the item of media content be watched at one or more times based on the determined probability; and presenting the user interface.

In accordance with some implementations of the disclosed subject matter, systems for presenting suggestions of media content are provided, the systems comprising: a hardware processor that is configured to: determine an item of media content; determine a probability of the item of media content being watched at one or more times based on at least one of: a characteristic of a person; a characteristic of a group; and a characteristic of the item of media content; create a user interface which suggests that the item of media content be watched at one or more times based on the determined probability; and present the user interface.

In accordance with some implementations of the disclosed subject matter, non-transitory computer-readable media containing computer executable instructions that, when executed by a processor, cause the processor to perform a method for presenting suggestions of media content are provided, the method comprising: determining an item of media content; determining, using a hardware processor, a probability of the item of media content being watched at one or more times based on at least one of: a characteristic of a person; a characteristic of a group: and a characteristic of the item of media content; creating a user interface which suggests that the item of media content be watched at one or more times based on the determined probability; and presenting the user interface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, as described in more detail below, mechanisms, which can include systems, methods, and computer-readable media, for presenting suggestions of media content are provided.

In some implementations, the presented suggestions can be based on a determination of how likely the user is to be interested in the media content. In some implementations, the presented suggestions can include a suggested time to watch the media content. In some such implementations, the suggested time(s) can be based on a determination of how likely a user is to watch the media content at the suggested time(s).

In accordance with some implementations, the mechanisms can include determining whether to present a suggestion of media content and/or determining at what time to suggest viewing the media content based on one or more factors. In instances where a user consents to the use of data such as the users's preferences for various types of media content and/or the user's location, such data can be used to present suggestions of media content. In some implementations, the factors can additionally or alternatively include aggregate group preferences. Additionally or alternatively, in some implementations, the factors can include historical data, data based on past choices, and/or real-time data. In some such implementations, which information is used to present suggestions of media content can be selected by a user.

In some implementations, a suggestion of media content and/or a suggestion of a time to watch the media content can be presented on a "card," where a card is a user interface which can present information to a user. In some implementations, a user can interact with the card, for example, by indicating that the user saw and liked the suggestion on the card. A card can be presented on a user interface on any suitable user device (e.g., a mobile phone, a tablet computer, a desktop computer, or any other suitable user device).

In some implementations, the mechanisms can determine which cards, if any, to create and present at a current moment in time. Additionally or alternatively, in some implementations, the mechanisms can determine which cards, if any, to create, store, and present at future times.

Figure 1:
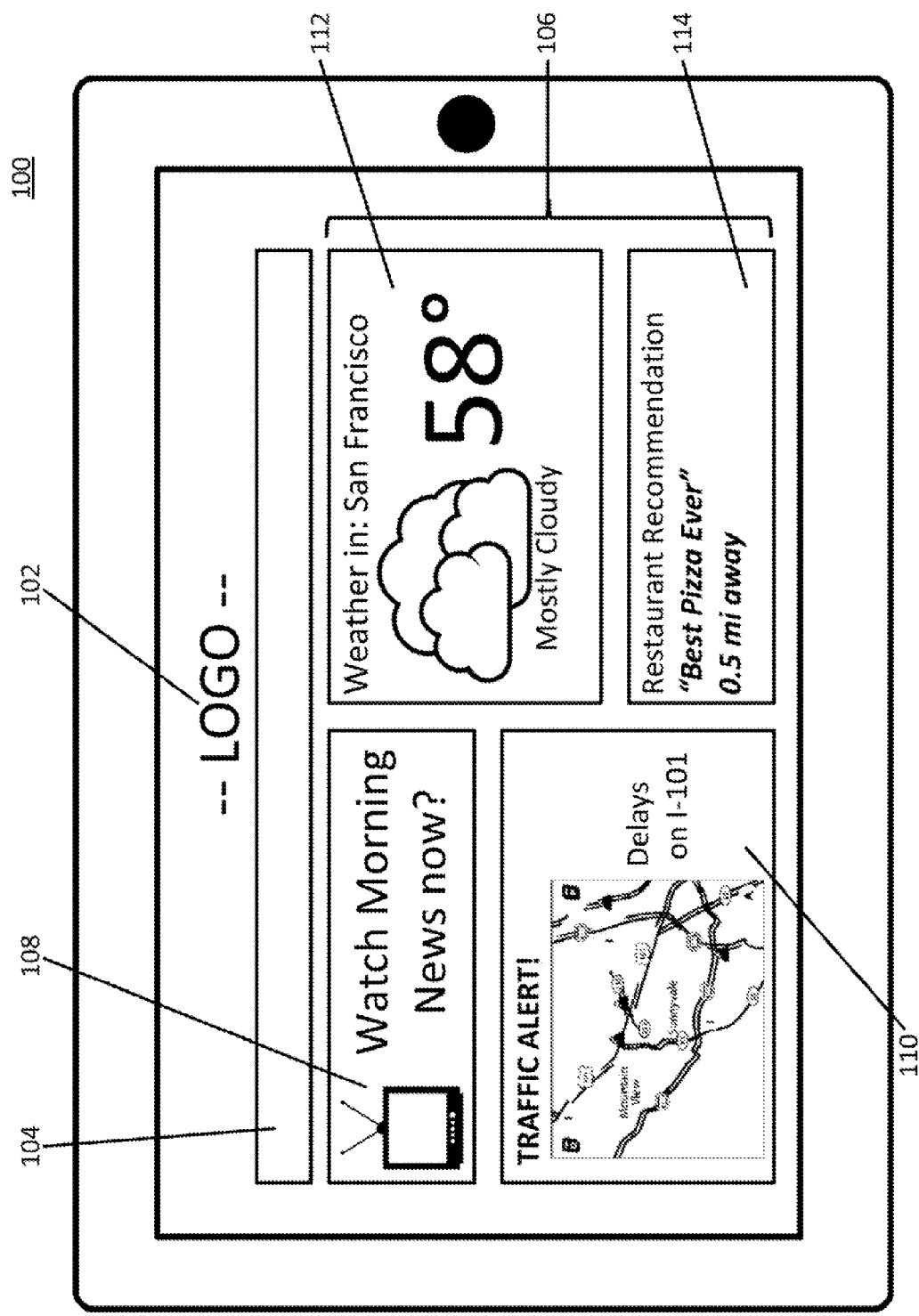
FIG. 1 is an example of a user interface for presenting one or more suggestions of media content to a user in accordance with some implementations.

Turning to FIG. 1, an example 100 of a user interface for presenting suggestions of media content as cards is shown in accordance with some implementations. As shown, in some implementations, user interface 100 can include a provider logo 102, a data entry box 104, and a set of cards 106.

Logo 102 can be any suitable logo of any suitable provider of user interface 100 and can include any suitable text, graphics, images, video, or any other suitable content, in accordance with some implementations. In some implementations, logo 102 can be omitted.

Data entry box 104 can be used by user interface 100 to receive data from a user of user interface 100. Any suitable data can be entered in data entry box 104. For example, data entry box 104 can be used to receive a search query from a user. Data entry box 104 can be any suitable mechanism for receiving data. For example, as shown in FIG. 1, data entry box 104 can be a text entry box. In some implementations, data entry box 104 can include any suitable radio buttons, checkboxes, drop-down menus, pushbuttons, or any other user interface controls. In some implementations, data entry box 104 can be omitted.

Set of cards 106 can include any suitable cards such as cards 108, 110, 112, and 114 as shown in FIG. 1. Individual cards (e.g., cards 108, 110, 112, and 114) within set of cards 106 can present any suitable information to a user. For example, an individual card can present the current or forecasted weather in a location which is determined to be of interest to the user, as shown in card 112. As another example, an individual card can present current traffic information at a location which is determined to be of interest to a user, as shown in card 110. As yet another example, an individual card can present a suggestion of media content which is determined to be of interest to a user, as shown in card 108. Presentation of cards can include presentation of any suitable images, icons, graphics, videos, animations, sounds, haptic feedback, or any other suitable accompanying content. For example, in some implementations, presentation of a card can include presenting an accompanying sound (e.g., a tone, a verbal description of the card content, or any other sounds) or accompanying haptic feedback (e.g., vibration of user device 312). Although there are four cards in set of cards 106 as shown in FIG. 1, any suitable number of cards (including none) can be presented to a user.

Although not shown in FIG. 1, in some implementations, cards can be interacted with by a user. For example, a card can be removed from user interface 100 if a user is not interested or is no longer interested in the information presented on the card. As another example, a card can be "selected" to perform an action or present more information. As a more particular example, if a card which displays current weather information is presented, the card can be selected, and in response, an action can be performed, for example, opening a Web site with more weather information. Cards can be interacted with in any suitable way. For example, in some implementations, cards can be dismissed by clicking or tapping on the card or on a "dismiss" icon (e.g., an "X" at the corner of the card or any other suitable icon). As another particular example, in some implementations, cards can be dismissed by "swiping" or "dragging" the card off the border of user interface 100. Similarly, cards can be selected by clicking, tapping, or any other suitable mechanism.

Although the cards shown in FIG. 1 pertain to a variety of topics such as weather, traffic, restaurant recommendations, and suggested media content, the cards presented at any given point in time can be related to any one topic or any suitable number or level of variety of topics.

In instances where a user consents to the use of data regarding the user's activity, such data can be used to create cards suggesting media content, in accordance with some implementations. In some implementations, the user activity used for presenting suggestions of media content can be limited to products provided by the company presenting the card(s) (e.g., limited to a particular search query interface, limited to a particular e-mail client, and/or any other particular products). Additionally or alternatively, in some implementations, a user can be required to sign into an account before user activity can be used to present media content suggestions. In some implementations, a user can specify that certain types of activity should or should not be considered when presenting a card with media content suggestions. For example, in some implementations, a user can specify that cards should only be presented based on, for example, search queries, streamed media content, and/or any other type of activity. As another example, in some implementations, a user can specify that certain types of activity, for example, reading or responding to e-mail, Web site browsing history, and/or any other type of activity, should not be considered when presenting a card with media content suggestions.

Figure 2:
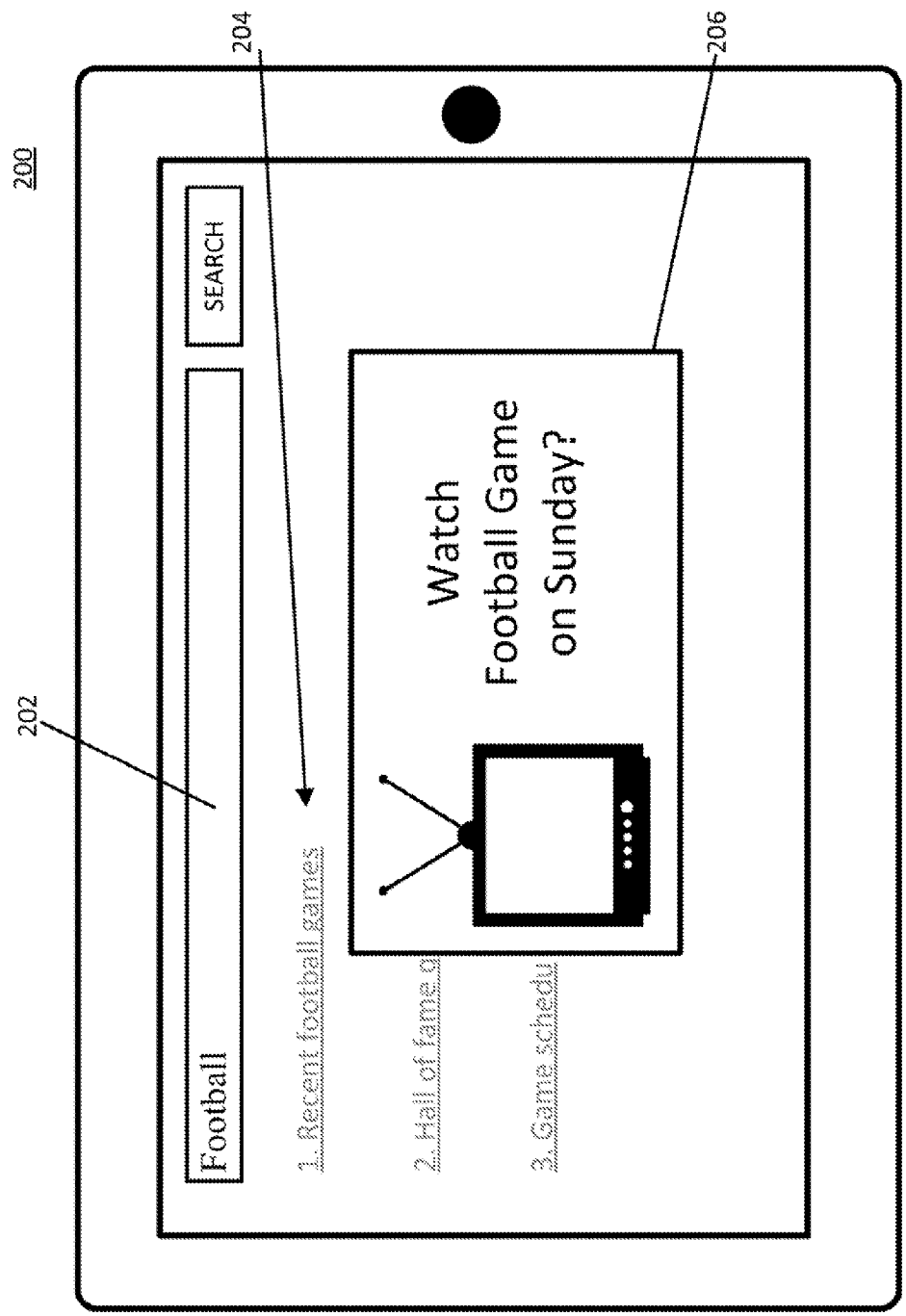
FIG. 2 is an example of a user interface for presenting a suggestion of media content to a user based on the user's activities in accordance with some implementations.

Turning to FIG. 2, an example 200 of a user interface for presenting a card based on a user's activity is illustrated in accordance with some implementations. As shown, in some implementations, user interface 200 can include an activity indicator 202, activity content 204, and a presented card 206.

Activity indicator 202 can be used to indicate an activity a user is engaged in. The activity can include any suitable action, such as inputting a search query, reading and/or responding to email, watching media content, or any other suitable activity. Activity indicator 202 can be any suitable mechanism for indicating a current activity and can include any suitable text, icons, graphics, images, or any other suitable content. For example, as shown in FIG. 2, activity indicator 202 can include a text block with the contents of a search query. As another example, activity indicator 202 can include an icon corresponding to a currently open application (e.g., a media player, an e-mail client, or any other application). Activity indicator 202 can be omitted at certain times or at all times in some implementations.

Activity content 204 can be any suitable content associated with an activity. Activity content 204 can include any suitable text, images, icons, graphics, videos, animations, applications, sounds, or any other suitable content. For example, as shown in FIG. 2, activity content 204 can include results of a search query. As another example, activity content 204 can include media (e.g., a video, a movie, music, or any other media content) which is being presented to user interface 200, e-mails, or any other suitable activity content.

Presented card 206 can be used to present a suggestion of media content and/or a suggestion of a time to watch the media content to a user. As shown in FIG. 2, in some implementations, the suggestion presented on card 206 can be linked to activity content 204. In the particular example shown in FIG. 2, activity indicator 202 and activity content 204 indicate that a search is being conducted, and in particular, the search is related to football. Therefore, in the particular example shown in FIG. 2, card 206 may suggest appropriate media content, is this example, a football game, to the user. As another particular example, if activity indicator 202 and activity content 204 indicate that a user is watching a particular movie, card 206 may suggest another movie featuring the same actor(s).

Figure 3:
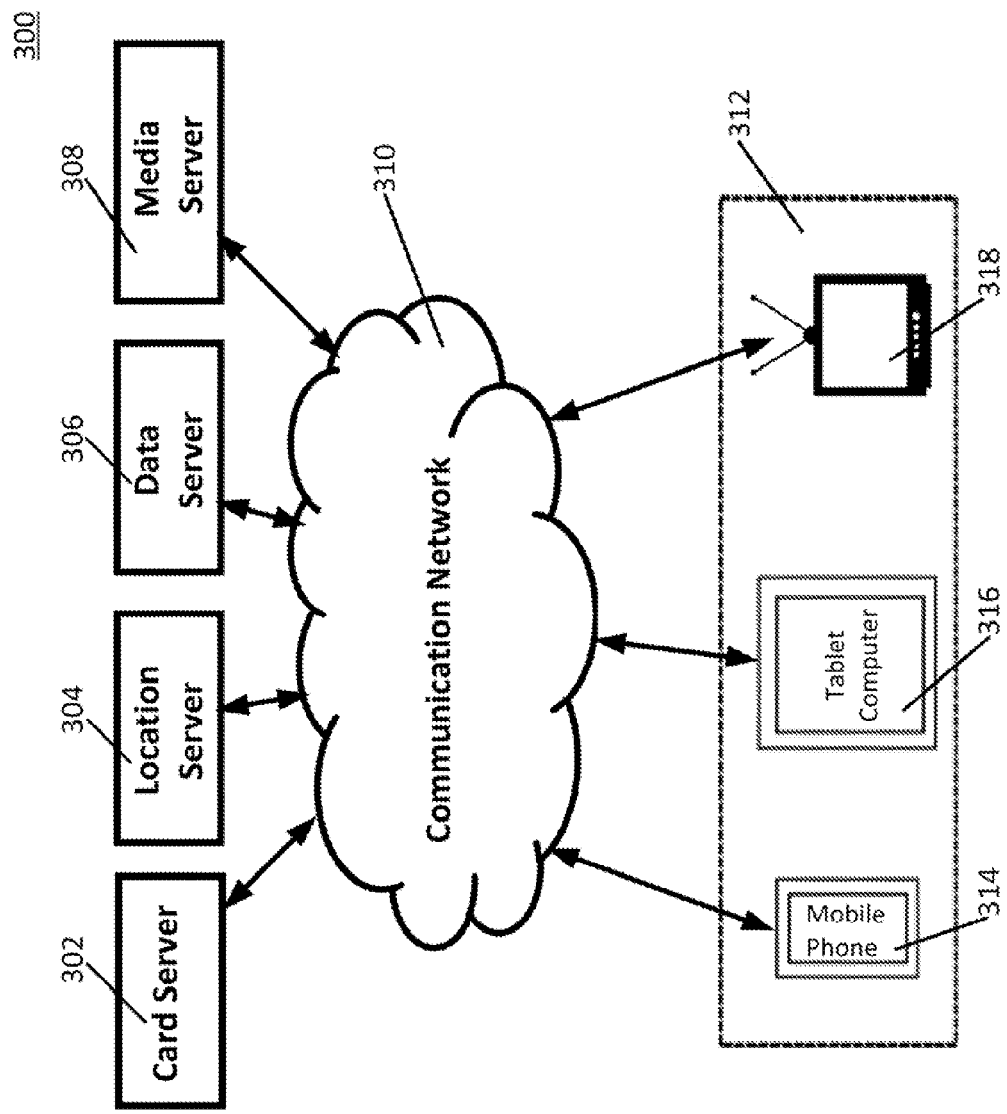
FIG. 3 shows a schematic diagram of hardware that can be used in accordance with some implementations.

Turning to FIG. 3, an example 300 of hardware that can be used in accordance with some implementations is shown. As illustrated, hardware 300 can include a card server 302, a location server 304, a data server 306, a media server 308, a communication network 310, and one or more user devices 312, such as a mobile phone 314, a tablet computer 316, and/or a television 318.

Card server 302 can be any suitable server for storing cards or parameters associated with cards and for presenting cards to a user device 312 in some implementations. For example, card server 302 can store parameters associated with the appearance of cards (e.g., colors, images, icons, or any other suitable parameters). Additionally or alternatively, card server 302 can deliver or present cards to a user device 312 via communication network 310. In some implementations, card server 302 can be omitted. In some implementations, cards and/or parameters associated with cards can be stored on and delivered from memory on user device 312.

In instances where a user consents to the use of data regarding the user's past locations, the user's present location, and/or the user's predicted future locations, location server 304 can be any suitable server for determining, storing, and delivering information related to the location of a user device 312 in some implementations. For example, location server 304 can determine and store the location of a user device 312 via communication with a Global Positioning System (GPS) device on the user device. As another example, location server 304 can provide the location of a user device 312 via communication network 310 when queried. Location(s) can be stored only in the context of an arbitrary device identification number in accordance with some implementations. In some implementations, location server 304 can be omitted.

Data server 306 can be any suitable server for storing and delivering data which is used in the creation of cards suggesting media content to a user. In instances where a user consents to the use of data such as the user's preferences or a user's past actions, such data can be stored on data server 306. Other data can include data relating to aggregate group data, or any other suitable data. For example, the data can include information regarding a user's preferred media content (determined either from preferences explicitly stated by the user or inferred based on a user's past choices), aggregate group preferences for media content (e.g., ratings, reviews, or any other indicator of group preferences), information relating to when a user prefers to watch media content, information relating to media content which is currently being discussed on one or more social networks, or any other suitable information. Data stored on data server 306 can be accessed when determining whether to show card(s) suggesting media content to a user and when determining what time to suggest watching the media content by any suitable process, for example, processes 500 and 600, as shown in and described in connection with FIGS. 5 and 6. In some implementations, a user can choose to modify or delete data regarding the user at any suitable time. Additionally or alternatively, in some implementations, the data stored on data server 306 can be treated in one or more ways, such that the user's identity is not stored and/or that data is only stored in the context of an arbitrary device identification number.

Media server 308 can be any suitable server for storing media content and delivering the content to a user device 108 in some implementations. For example, media server 308 can be a server that streams media content to user device 312 via communication network 310. Media content provided by media server 308 can be any content suitable to be suggested to a user, such as video content, audio content, television programs, movies, cartoons, music, sound effects, audiobooks, streaming live content (e.g., a streaming radio show, a live concert, or any other streaming live content), or any other suitable media content. In some implementations, media server 308 can be omitted. In some implementations, media content can additionally or alternatively be delivered from memory on user device 312.

Communication network 310 can be any suitable combination of one or more wired and/or wireless networks in some implementations. For example, communication network 310 can include any one or more of the Internet, a mobile data network, a satellite network, a local area network, a wide area network, a telephone network, a cable television network, a WiFi network, a WiMax network, and/or any other suitable communication network.

User devices 312 can include any one or more user devices suitable for receiving suggestions of media content. For example, in some implementations, user devices 312 can include mobile devices, such as a mobile phone 314, a tablet computer 316, a laptop computer, a vehicle (e.g., car, boat, airplane, or any other suitable vehicle) entertainment system, a portable media player, or any other suitable mobile device. As another example, in some implementations, user devices 312 can include non-mobile devices such as a desktop computer, a set-top box, a television 318, a streaming media player, a game console, or any other suitable non-mobile device.

Although card server 302, location server 304, data server 306, and media server 308 are illustrated as separate devices, any one or more of these devices can be combined into one device in some implementations. Also, although only one each of card server 302, location server 304, data server 306, and media server 308 are shown in FIG. 3 to avoid over-complicating the figure, any suitable one or more of each device can be used in some implementations.

Although three user devices 314, 316, and 318 are shown in FIG. 3 to avoid over-complicating the figure, any suitable number of each of these devices, and any suitable types of these devices, can be used in some implementations.

Figure 4:
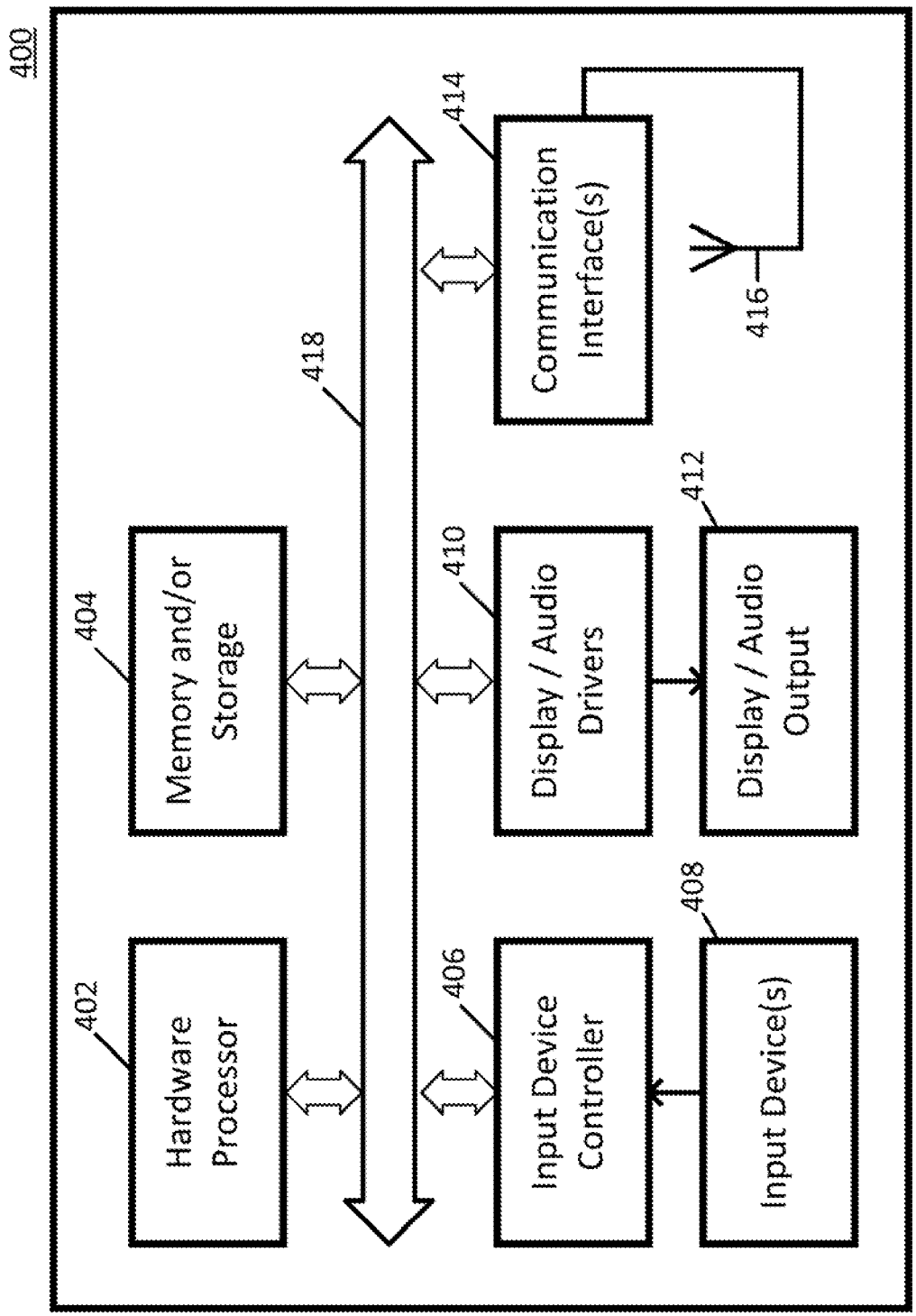
FIG. 4 shows an example of hardware that can be used in a server and/or a user device in accordance with some implementations.

Card server 302, location server 304, data server 306, media server 308, and user devices 312 can be implemented using any suitable hardware in some implementations. For example, in some implementations, devices 302, 304, 306, 308, and 312 can be implemented using any suitable general purpose computer or special purpose computer. For example, mobile phone 314 may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some implementations.

Memory and/or storage 404 can be any suitable memory and/or storage for storing programs, data, media content, and/or any other suitable information in some implementations. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some implementations. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output circuitries 412 in some implementations. For example, display/audio drivers 410 can be circuitry for driving an LCD display, a speaker, an LED, or any other type of output device.

Communication interface(s) 414 can be any suitable circuitry for interfacing with one or more communication networks, such as network 310 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network in some implementations. In some implementations, antenna 416 can be omitted when not needed.

Bus 418 can be any suitable mechanism for communicating between two or more components 402, 404, 406, 410, and 414 in some implementations.

Any other suitable components can be included in hardware 400 in accordance with some implementations.

Figure 5:
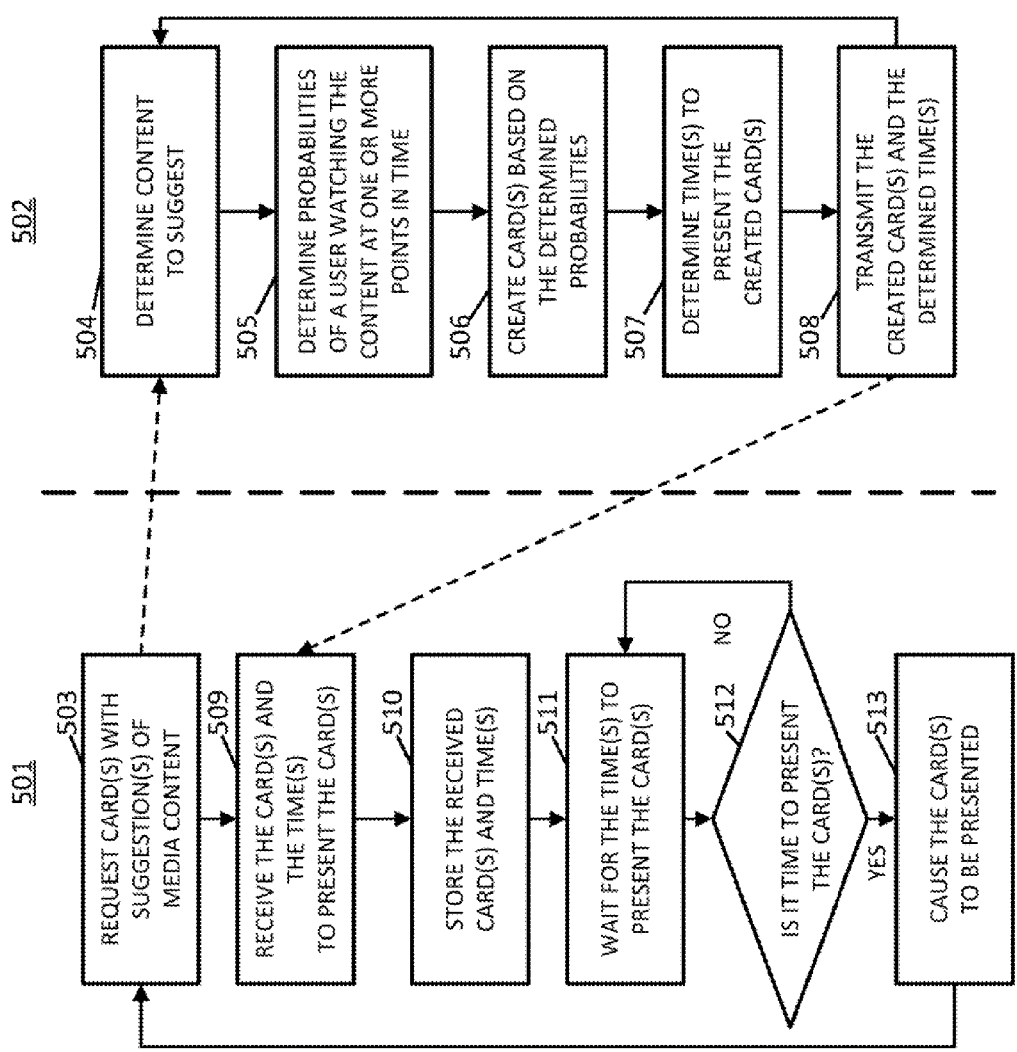
FIG. 5 shows a flowchart of an example of a process for requesting, receiving, and presenting suggestions of media content to a user, as well as a flowchart of an example of a process for creating and transmitting suggestions of media content.

Turning to FIG. 5, an example 501 of a process for requesting, receiving, and presenting one or more cards with suggestions of media content and an example 502 of a process for determining if and/or when one or more cards suggesting media content should be presented are illustrated in accordance with some implementations. Processes 501 and 502 can be executed by a hardware processor in any suitable device. For example, in some implementations, process 501 can be executed by a user device 312. As another example, in some implementations, process 502 can be executed by card server 302.

Components of hardware 400 can be used to execute the blocks of processes 501 and 502. For example, a user device 312 can request card(s) with suggestions of media content to present to a user by sending a signal via communication network 310 to an external device (e.g., card server 302). Similarly, once cards with suggestions of media content are created, card server 302 can transmit the created cards to a user device 312 via communication network 310. As another example, cards received by process 501 can be stored in memory 404 of a user device. As yet another example, cards can be presented at a determined time by hardware processor 402 on user device 312 directing display/audio drivers 410 to present the card and any accompanying content to display/audio output 412.

Process 501 can begin by requesting cards with suggestions of media content to present to a user at 503. In instances where a user consents to the use of the user's device to send requests for cards with suggestions of media content, the request can be sent from a user device to an external device, such as card server 302. Requests for cards with suggestions of media content can be made at any suitable frequency, and the determination of whether to send a request can be made based on any suitable information. For example, in some implementations, a request for cards can be sent at a fixed frequency (e.g., once per second, once per minute, once per hour, or any other suitable frequency). In some implementations, a request for cards can be sent based on a user's activity. As a more particular example, a request for cards can be sent when it is determined that a user has submitted a search query pertaining to media content. As another particular example, a request for cards can be sent when it is determined that a user has just arrived at the user's home.

Turning to process 502, process 502 can begin by determining media content to suggest to a user at 504. The media content can be determined based on any suitable information. For example, the information can include information about a user device, the presence of detected nearby device(s), a user's preferences, a user's past choices, aggregate ratings of media content, current events, and/or any other suitable information. As a more particular example, the information can indicate that a user has previously watched a particular television program, and the information can therefore indicate that the particular television program is a candidate for suggestion to the user. As another particular example, the information can indicate that a user has previously watched situational comedies frequently, and the information can therefore indicate another television program within the genre of situational comedies is a candidate for suggestion to the user. As yet another particular example, the information can indicate that a particular television program, movie, event broadcast, or any other media content is being discussed on one or more social media networks, and the information can therefore indicate that the particular content being discussed is a candidate for suggestion to the user.

Process 502 can determine the probabilities of a user watching the media content at one or more points in time at 505. The one or more points in time can include any suitable times and any suitable number of times. For example, the points in time can include the current time and any times in the future over any suitable time period. As a more particular example, the points in time can include points in time such as the current time, an hour from the current time, six hours from the current time, the next day, the next weekend, or any other suitable points in time. Therefore, the determined probabilities can include a probability of a user watching the media content at the one or more points in time, and, in some implementations, each probability can be different. As a specific example, the determined probabilities can indicate that the probability of the user watching the media content now is 0.8, the probability of the user watching the media content 6 hours from now is 0.2, the probability of the user watching the media content tomorrow morning is 0.4, and/or any other suitable probability corresponding to the media content and a point in time.

Any suitable method for determining the probabilities can be used. For example, information from multiple factors can be combined to determine the probabilities. As a more particular example, in some implementations, information regarding a user device, the presence of detected nearby device(s), a user's preferences regarding the media content, aggregate group preferences regarding the media content, a user's preferences regarding content viewing at one or more points in time, aggregate group preferences regarding content viewing at one or more points in time, and a user's location can be used to generate a model of the probabilities of the user watching the media content, as shown in and described in connection with FIG. 6.

Process 502 can create card(s) suggesting media content based on the determined probabilities at 506. The card(s) can contain any suggestions for suitable times for watching the media content. For example, a card can be created suggesting that a user watch the media content at the point in time with the highest determined probability. As a more particular example, if the determined probabilities suggest that a user is most likely (with the highest determined probability) to watch a particular program at 9 p.m., a card can be created which suggests that the user watch the program at 9 p.m. Any suitable number of cards (including none) can be created by process 502 at 506. For example, in some implementations, if the determined probabilities are all at and/or below a pre-determined threshold (e.g., 0.2, 0.5, or any other suitable threshold.) indicating that a user is relatively unlikely to watch the media content at any of the points in time, zero cards can be created. As another example, in some implementations, process 502 can create cards corresponding to all points in time where the determined probabilities of a user watching the media content exceed a pre-determined threshold (e.g., a probability of greater than 0.5 or any other pre-determined threshold). As yet another example, in some implementations, process 502 can create cards corresponding to the top N points in time, where N can be any suitable number less than or equal to the number of points in time.

Process 502 can determine time(s) to present the created card(s) at 507. Any suitable time(s) can be determined including the current time and/or any suitable time in the future. For example, it can be determined that a card which was created at block 506 should be presented the next day. Any suitable mechanism for determining the time for card presentation can be used. For example, in some implementations, the future times can be determined based on the time suggested on the created cards. As a more particular example, if a card suggesting that a user watch a particular program on Sunday was created at block 506, process 502 can determine that the card should be presented on Saturday. As another particular example, if a card suggesting that a user watch a particular program which begins in one hour was created, process 502 can determine that the card should be presented at the current time.

Process 502 can transmit the created cards and the determined times at 508. The cards and/or the times can be transmitted from any suitable device (e.g., card server 302) to any suitable device (e.g., a user device 312).

After transmitting the created cards and the determined times, process 502 can loop back to 504 and wait for another request to determine media content to suggest.

Turning back to process 501, process 501 can receive one or more cards with suggestions of media content and one or more times to present the cards at 509. The cards and times can be received by any suitable device, for example, a user device 312.

Process 501 can store the received cards and the received times to present the cards at 510. The cards and the times can be stored in any suitable location (e.g., in memory 404 of a user device 312).

Process 501 can wait for the times to present the cards at 511. As a particular example, if the time to present a received card is six hours from the current time, process 501 can wait for six hours. Note that in some implementations, each card received at 509 can have a different corresponding time to present the card, and process 501 can therefore wait a different amount of time for each card.

Process 501 can determine if it is time to present a card at 512. Determination of if it is time to present a card can be implemented with any suitable mechanism. For example, in some implementations, process 501 can iterate through each card and each card's time for presentation in a set of stored cards and determine whether or not the current time matches the time for presentation.

If, at 512, it is determined that the time to present a card has not arrived, process 501 can loop back to 511 and continue waiting for the time to present a card.

If, at 512, it is determined that it is time to present a card, process 501 can cause the card to be presented on a user interface at 513. The card can be presented with any suitable mechanism and with any suitable accompanying content, as described in connection with FIGS. 1 and 2.

After process 501 causes the card to be presented at 513, process 501 can loop back to 503 to request another card with suggestions of media content.

Figure 6:
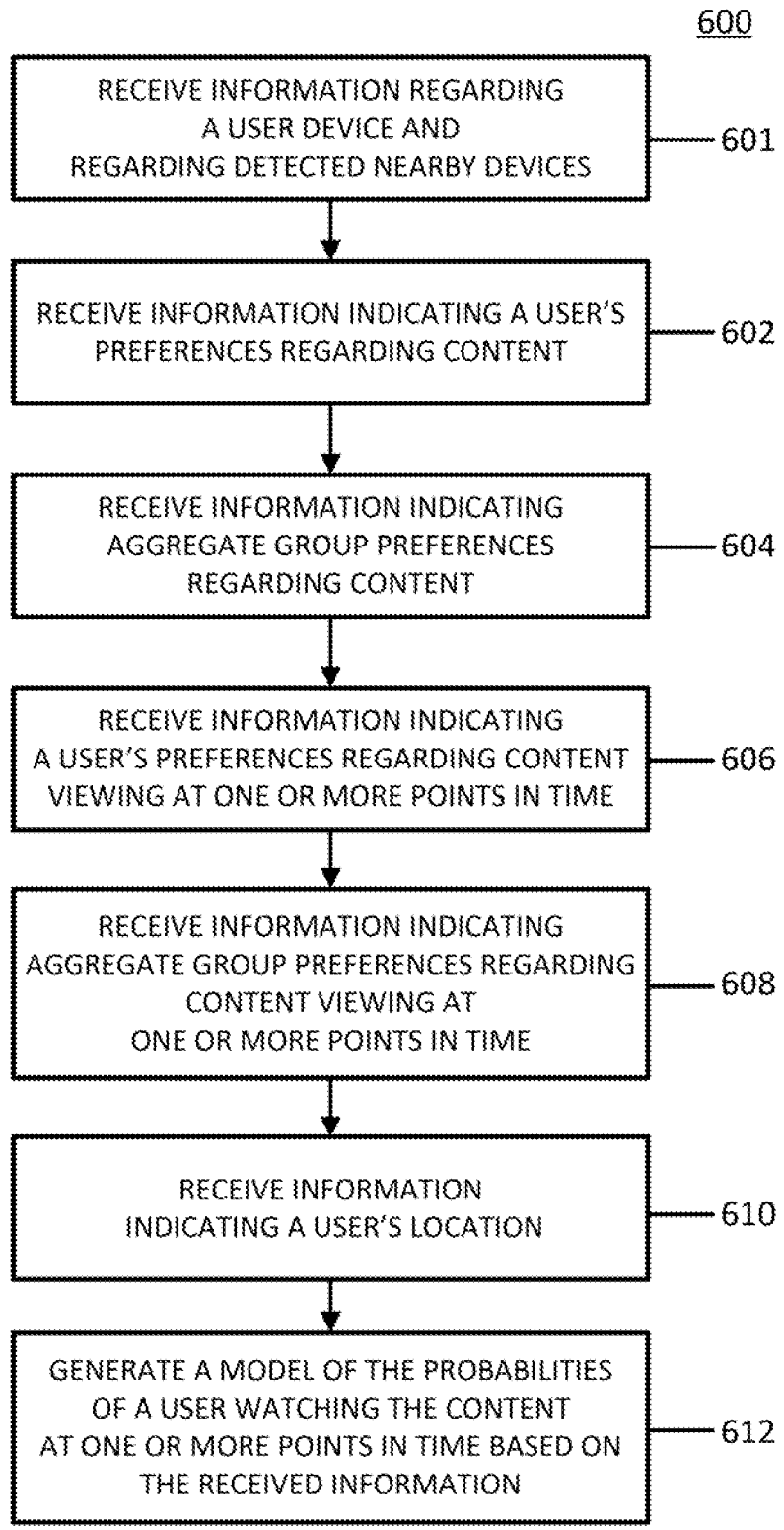
FIG. 6 shows a flowchart of an example of a process for generating a model of probabilities that a user will watch media content at one or more times based on a plurality of factors.

Turning to FIG. 6, an example 600 of a process for generating a model of the probabilities of a user watching or listening to some media content at one or more points in time based on received information such as a user's preferences regarding content, aggregate group preferences regarding content, a user's preferences regarding time for media content viewing, aggregate group preferences regarding time for media content viewing and a user's location is illustrated in accordance with some implementations. In some implementations, the media content can be a particular instance of media content, for example, a particular television program, news broadcast, concert, movie, or any other suitable media content. In some implementations, the media content can be a more general type of media content, for example, a genre of media content (e.g., situation comedies, dramas, documentaries, concerts in general, news in general, or any other genre).

Process 600 can be implemented on any suitable one or more devices. For example, in some implementations, process 600 can be partially or fully implemented on a data server 306, which can contain information received in blocks of process 600. Additionally or alternatively, process 600 can be partially or fully implemented on card server 302. In some such implementations, information received in blocks of process 600 can be sent from data server 306 to card server 302 via communication network 310.

Process 600 can receive information about a user device 312 and/or about one or more detected nearby devices at 601. The received information can include any suitable information and can include any suitable level of detail. For example, received information regarding the user device can indicate whether a particular user device (e.g., the user device receiving the suggestions of media content) is suitable for presenting the media content. As a more particular example, the received information can indicate that the user device to receive card(s) with suggestions of media content to present is a mobile phone with a weak connection to a given network. As another particular example, the received information can indicate that the user device to receive card(s) with suggestions of media content is a desktop computer with an Ethernet connection.

As another example, in instances where a user has consented to the detection of nearby devices near the user's device, the received information can indicate the presence of one or more nearby devices which may be suitable for presenting media content. As a more particular example, the received information can indicate that a television has been detected near the user device 312 which is receiving the cards with suggestions of media content. In some such implementations, the presence of nearby devices can be detected with any suitable mechanism, for example, through a connection to a common network (e.g., a BLUETOOTH network, a WiFi network, a local area network, and/or any other suitable network), through GPS, and/or through any other suitable mechanism.

In instances where a user has consented to the use of data regarding the user's preferences, process 600 can receive such information at 602. The received information can include any suitable information and can include information based on either past events/choices or based on current activities. For example, received information regarding content can include a user's explicit preferences (e.g., an indication from a user of the name of their favorite television program, an indication from a user of their favorite genre of television program, an indication from a user of their favorite actor, or any other indication of a user's preferences) and/or preferences that are inferred (e.g., data indicating that a user frequently watches a particular television program, data indicating that a user frequently watches movies or programs starring a particular actor, data indicating that a user frequently watches programs or movies of a certain genre, or any other suitable data indicating a user's preferences). In implementations which derive implicit preferences from a user's activity, user consent (e.g., by signing into an account, by confirming that a statement regarding privacy has been read, and/or any other suitable form of consent) can be required to allow process 600 to receive information about the user's activity. In some implementations, the received information can include information about what a user is currently searching for or discussing. For example, the received information can include information about Web sites a user is currently browsing and/or a topic a user is discussing in an e-mail or online chat. In the specific example shown in FIG. 2, the received information can indicate that a user is currently searching for information about a particular topic. As another particular example, the received information can indicate that a user is currently searching for information about a particular event (e.g., a political debate, a concert, an awards show, or any other suitable event). As yet another particular example, the received information can indicate that a user is currently discussing an episode of a television program in an e-mail or in an online chat.

In some implementations, a user can control what information indicating the user's preferences is received by process 600 to protect privacy. For example, in some implementations, a user can specify that only explicitly stated preferences (e.g., a user explicitly stating their favorite television program, a user explicitly stating their favorite genre of media content, and/or any other explicit statements of preference) should be received by process 600. As another example, in some implementations, a user can specify that certain types of activity (e.g., reading or responding to e-mail, Web browsing, search queries, and/or any other type of activity) should or should not be used by process 600.

Process 600 can receive information indicating aggregate group preferences regarding media content at 604. The received information can include any suitable information and can be based on any suitable source(s). For example, the received information can indicate the popularity of a particular item of media content, and their popularity can be based on past ratings or rankings (e.g., ratings, reviews, or any other indicator of popularity). As a particular example, the received information can indicate that the media content was the most-watched television program in the country during the past week. As another example, the received information can indicate current trends of media content popularity, e.g., based on topics discussed on one or more social media networks. As a particular example, the received information can indicate the media content relates to a particular event (e.g., a sporting event, a political event, a news event, or any other suitable event), program (e.g., a series finale, an awards show, or any other suitable program), movie, or any other suitable media content, which is currently being discussed by people on a social media network.

In instances where a user has consented to the use of data regarding the user's preferences for viewing content at different times, process 600 can receive such information at 606. The received information can include any suitable information and can be from any suitable source. For example, the received information can indicate that a user tends to watch television programs at a particular time (e.g., after 9 p.m., in the morning, Sunday afternoons, or any other time). The received information can additionally or alternatively indicate that a user tends not to watch media content at particular times, for example, that a user never watches television on Friday nights. The received information can be of any suitable level of detail, and in some implementations, can indicate interactions between the media content or type of media content and the time of day or time of week. As a more particular example, the received information can indicate that a user prefers to watch news broadcasts on weekday mornings and/or prefers to watch sports broadcasts on weekend afternoons. As another particular example, the received information can indicate that a user watches a particular television program at a particular day and time every week. In some such implementations which infer user preferences regarding content viewing at different times based on a user's activity, user consent can be required to allow process 600 to receive the information. In some implementations, information indicating a user's past choices can be stored for only a pre-determined time period (e.g., an hour, a day, a week, or any other suitable time period) of the user's choice.

Process 600 can receive information indicating aggregate group preferences regarding content viewing at different times at 608. The received information can include any suitable information and can be from any suitable source. For example, the received information can indicate times of the day or times of the week that people in general tend to watch media content. The received information can be of any suitable level of detail. For example, in instances where a user has provided demographic information (e.g., age, gender, and/or any other demographic information), such information can be used to restrict the aggregate group to a particular demographic corresponding to the user. For example, the received information can indicate that people of a particular demographic corresponding to the user tend to watch a particular genre of media content at a particular time of day. As a more particular example, the received information can indicate that a particular television program which airs at a particular time is especially popular among people of a certain age range.

In instances where a user has consented to the use of data regarding the user's current location or the user's predicted future location(s), process 600 can receive such information at 610. In some implementations, user consent can be required for process 600 to receive location information. The received information can include any suitable information regarding a user's location, and, in some implementations, can additionally or alternatively indicate interactions with types of media content or times of media content viewing. As a particular example, the received information can indicate that a user is at the user's workplace and tends not to watch media content at that location. As another specific example, the received information can indicate that a user is currently at home, and is therefore likely to want to watch media content. As yet another specific example, the received information can indicate that a user is currently at the user's workplace, but, based on past information regarding location, the user is likely to go home soon.

The information received at blocks 601, 602, 604, 606, 608, and 610 can be stored on and received from any suitable source(s). For example, in some implementations, the received information can be stored on data server 306. Additionally or alternatively, in some implementations, the received information can be stored in memory on user device 312. In some implementations, a user can indicate that certain information (e.g., user preferences inferred based on past choices, user preferences based on current activity, user location, or any other information) should not be stored, and should therefore not be received in blocks 601, 602, 604, 606, 608, and/or 610. In some implementations, a user can indicate that certain information regarding choices, activities, and/or locations, should only be stored for a pre-determined amount of time (e.g., for an hour, a day, a month, or any other amount of time).

Process 600 can generate a model of the probabilities of a user watching the media content at one or more points in time based on the information received at blocks 601, 602, 604, 606, 608, and 610. Any one or more suitable techniques can be used which incorporate information from a plurality of factors to generate the model of the probabilities. As one particular example, each piece of information received at blocks 601, 602, 604, 606, 608, and 610 can be scored and weighted on any suitable scale, and the resulting weighted scores can be combined in any suitable way to determine a probability for each of the one or more points in time. In some implementations, any combination of any suitable machine learning or statistical techniques, including linear combinations, neural networks, classification algorithms, recommender systems, Bayesian statistics, and/or any other suitable techniques can be used to generate a model of the probabilities of the user watching the media content at one or more points in time.

In some implementations, the model of the probabilities generated at block 612 can include a model of the probabilities of a user watching the media content on a detected device other than the user device receiving the card(s) with the suggestions of media content. For example, if the presence of a nearby device such as a television was detected (e.g., as described in connection with block 601), the model of the probabilities can include the probabilities of a user watching the media content on the television at one or more times.

It should be understood that at least some of the above described blocks of the processes of FIGS. 5 and 6 can be executed or performed in any order or sequence not limited to the order and sequence shown and described in the figures. Also, some of the above blocks of the processes of FIGS. 5 and 6 can be executed or performed substantially simultaneously where appropriate or in parallel to reduce latency and processing times.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, or any other suitable magnetic media), optical media (such as compact discs, digital video discs, Blu-ray discs, or any other suitable optical media), semiconductor media (such as flash memory, electrically programmable read-only memory (EPROM), electrically erasable programmable read-only memory (EEPROM), or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative implementations, it is understood that the present disclosure has been made only by way of example, and that numerous changes in the details of the implementation of the invention can be made without departing from the spirit and scope of the invention, which is limited only by the claims that follow. Features of the disclosed implementations can be combined and rearranged in various ways.

What is claimed is:

1. A method for presenting suggestions of media content, comprising:

determining an item of media content having a plurality of defined presentation start times;

determining, using a communication network, a current location of a user device and that a user is not at a predicted future location at which a user is to want to be presented with the item of media content;

determining, using a hardware processor, probabilities of the item of media content being watched at the plurality of defined presentation start times based on the current location, a preferred view time of the user, and at least one of a characteristic of the user; a characteristic of a group; and a characteristic of the item of media content;

creating a user interface which suggests that the item of media content be watched at one of the plurality of defined presentation start times based on a highest probability of the determined probabilities;

at a first point in time, determining a time at which the user interface is to be scheduled for presentation, wherein the time is later than the first point in time;

at a second point in time, determining whether the second point in time is the time at which the user interface is scheduled for presentation; and in response to determining that the second point in time is the time at which the user interface is scheduled for presentation, presenting the user interface on the user device.

2. The method of claim 1, wherein the characteristic of the user is the person's past choice of media content.

3. The method of claim 1, wherein the preferred view time of the user is a past choice of time to watch media content.

4. The method of claim 1, wherein the characteristic of the group is a popularity of the item of media content.

5. The method of claim 1, wherein the characteristic of the item of media content is a genre of the item of media content.

6. The method of claim 1, further comprising:
determining whether the highest probability exceeds a pre-determined threshold; and
suggesting the item of media content when the highest probability exceeds a pre-determined threshold.

7. A system for presenting suggestions of media content, the system comprising:
a hardware processor that is configured to:
determine an item of media content having a plurality of defined presentation start times;
determine, using a communication network, a current location of a user device and that a user is not at a predicted future location at which a user is to want to be presented with the item of media content;
determine probabilities of the item of media content being watched at the plurality of defined presentation start times based on the current location, a preferred view time of the user, and at least one of a characteristic of a person the user; a characteristic of a group; and a characteristic of the item of media content;
create a user interface which suggests that the item of media content be watched at one of the plurality of defined presentation start times based on a highest probability of the determined probabilities;
at a first point in time, determine a time at which the user interface is to be scheduled for presentation, wherein the time is later than the first point in time;
at a second point in time, determine whether the second point in time is the time at which the user interface is scheduled for presentation; and
in response to determining that the second point in time is the time at which the user interface is scheduled for presentation, presenting the user interface on the user device.

8. The system of claim 7, wherein the characteristic of the user is the person's past choice of media content.

9. The system of claim 7, wherein the preferred view time of the user is a past choice of time to watch media content.

10. The system of claim 7, wherein the characteristic of the group is a popularity of the item of media content.

11. The system of claim 7, wherein the characteristic of the item of media content is a genre of the item of media content.

12. The system of claim 7, wherein the hardware processor is further configured to:
determining whether the highest probability exceeds a pre-determined threshold; and
suggesting the item of media content when the highest probability exceeds a pre-determined threshold.

13. A non-transitory computer-readable medium containing computer executable instructions that, when executed by a processor, cause the processor to perform a method for presenting suggestions of media content, the method comprising:
determining an item of media content having a plurality of defined presentation start times;
determining, using a communication network, a current location of a user device and that a user is not at a predicted future location at which a user is to want to be presented with the item of media content;
determining probabilities of the item of media content being watched at the plurality of defined presentation start times based on the current location, a preferred view time of the user, and at least one of: a characteristic of a person the user; a characteristic of a group; and a characteristic of the item of media content;
creating a user interface which suggests that the item of media content be watched at one of the plurality of defined presentation start times based on a highest probability of the determined probabilities;
at a first point in time, determining a time at which the user interface is to be scheduled for presentation, wherein the time is later than the first point in time;
at a second point in time, determining whether the second point in time is the time at which the user interface is scheduled for presentation; and
in response to determining that the second point in time is the time at which the user interface is scheduled for presentation, presenting the user interface on the user device.

14. The non-transitory computer-readable medium of claim 13, wherein the characteristic of the user is the person's past choice of media content.

15. The non-transitory computer-readable medium of claim 13, wherein the preferred view time of the user is a past choice of time to watch media content.

16. The non-transitory computer-readable medium of claim 13, wherein the characteristic of the group is a popularity of the item of media content.

17. The non-transitory computer-readable medium of claim 13, wherein the characteristic of the item of media content is a genre of the item of media content.

18. The non-transitory computer-readable medium of claim 13, wherein the method further comprises:
determining whether the highest probability exceeds a pre-determined threshold; and
suggesting the item of media content when the highest probability exceeds a pre-determined threshold.

* * * * *